United States Patent
Kato et al.

(10) Patent No.: US 9,527,496 B2
(45) Date of Patent: *Dec. 27, 2016

(54) INDUSTRIAL VEHICLE AND METHOD FOR CONTROLLING INDUSTRIAL VEHICLE

(71) Applicant: KABUSHIKI KAISHA TOYOTA JIDOSHOKKI, Kariya-shi, Aichi-ken (JP)

(72) Inventors: Norihiko Kato, Kariya (JP); Yukikazu Koide, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 352 days.

This patent is subject to a terminal disclaimer.

(21) Appl. No.: 14/271,608

(22) Filed: May 7, 2014

(65) Prior Publication Data

US 2014/0336002 A1    Nov. 13, 2014

(30) Foreign Application Priority Data

May 13, 2013    (JP) ................................. 2013-101443

(51) Int. Cl.
*B66F 9/22*    (2006.01)
*B60W 10/10*    (2012.01)
*B60W 10/06*    (2006.01)

(52) U.S. Cl.
CPC .............. *B60W 10/10* (2013.01); *B60W 10/06* (2013.01); *B66F 9/22* (2013.01); *Y10T 477/631* (2015.01)

(58) Field of Classification Search
None
See application file for complete search history.

(56) References Cited

FOREIGN PATENT DOCUMENTS

| | | |
|---|---|---|
| EP | 2075217 A2 | 7/2009 |
| EP | 2381081 A2 | 10/2011 |
| JP | 2012-062137 A | 3/2012 |

*Primary Examiner* — Erin D Bishop
(74) *Attorney, Agent, or Firm* — Sughrue Mion, PLLC

(57) ABSTRACT

An industrial vehicle that includes an engine, a hydraulic actuator, a hydraulic pump, and an instruction member operated to instruct operation of the hydraulic actuator. A supply passage supplies hydraulic oil to the hydraulic actuator. A return passage returns return the hydraulic oil to an oil tank. A controller compares an engine speed and a predetermined comparison threshold value. When the engine speed is less than the comparison threshold value, the controller opens the return passage. The comparison threshold value includes a first threshold value and a second threshold value that is lower than the first threshold value. In response to the operation of the instruction member, the controller opens the return passage, performs revving control to increase the engine speed, and changes the comparison threshold value from the first threshold value to the second threshold value.

6 Claims, 2 Drawing Sheets

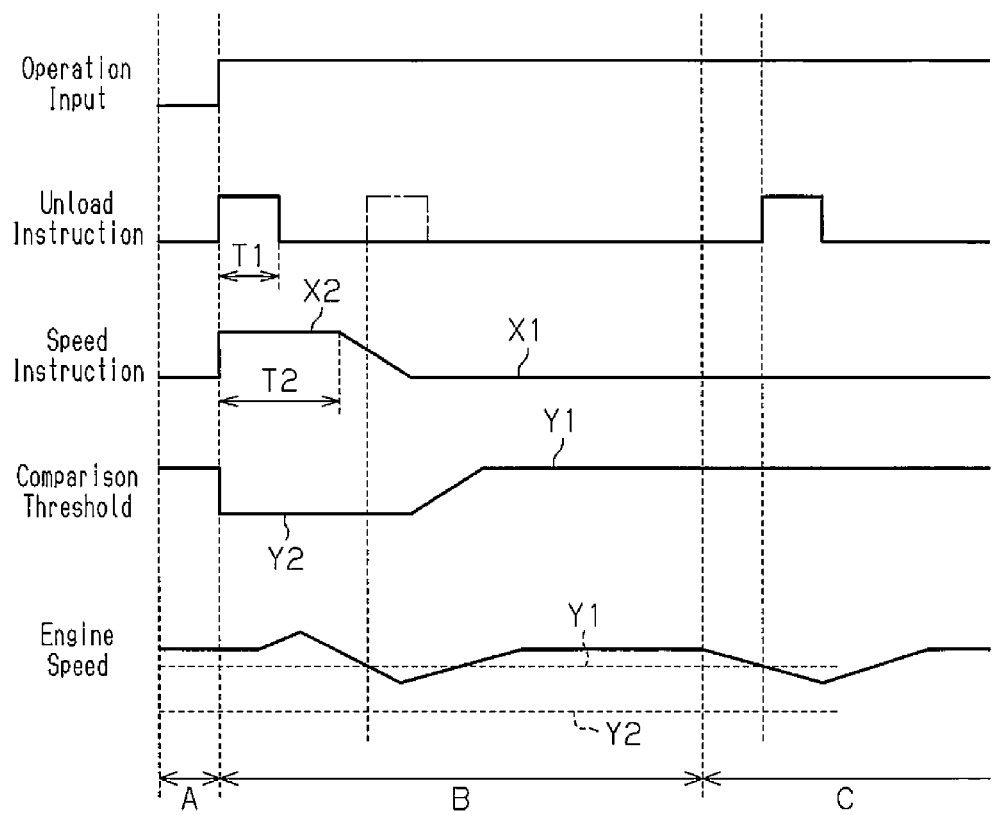

INDUSTRIAL VEHICLE AND METHOD FOR CONTROLLING INDUSTRIAL VEHICLE

BACKGROUND OF THE INVENTION

The present invention relates to an industrial vehicle including a hydraulic actuator and a hydraulic pump that is driven by an engine and a method for controlling the industrial vehicle.

A forklift is one example of an industrial vehicle that includes an engine, a hydraulic pump driven by the engine, and a hydraulic mechanism that operates a hydraulic actuator by hydraulic oil discharged from the hydraulic pump. The forklift includes, for example, a lifting hydraulic cylinder, which is a hydraulic actuator that lifts and lowers forks, and a tilting hydraulic cylinder, which is a hydraulic actuator that tilts a mast. When the hydraulic pump is driven by the engine, an increase in the load on the hydraulic pump may reduce the engine torque. This may result in insufficient engine torque and stall the engine. Japanese Laid-Open Patent Publication No. 2012-62137 describes an example of a structure that obviates such engine stalling.

However, the structure of the '137 publication opens a discharge pipe of the hydraulic pump after detecting a reduction in the engine speed. Thus, the engine speed is further reduced before the load on the hydraulic pump is reduced by opening the discharge pipe. Thus, the structure of the '137 publication fails to obviate engine stalling.

SUMMARY OF THE INVENTION

It is an object of the present disclosure to provide an industrial vehicle that obviates engine stalling and a method for controlling an industrial vehicle.

To achieve the above object, one aspect of the present invention is an industrial vehicle that includes an engine, a hydraulic actuator, a hydraulic pump driven by the engine, and an instruction member operated to instruct operation of the hydraulic actuator. A supply passage is adapted to supply hydraulic oil discharged from the hydraulic pump to the hydraulic actuator. A return passage is adapted to return the hydraulic oil discharged from the hydraulic pump to an oil tank. A controller is adapted to compare an engine speed and a predetermined comparison threshold value. The controller is adapted so that when the engine speed is less than the comparison threshold value, the controller opens the return passage so that the hydraulic oil flows through the return passage. The comparison threshold value includes a first threshold value and a second threshold value that is lower than the first threshold value. The controller is adapted to, in response to the operation of the instruction member, open the return passage so that the hydraulic oil flows through the return passage, perform revving control to increase the engine speed, and change the comparison threshold value from the first threshold value to the second threshold value.

Another aspect of the present invention is a method for controlling an industrial vehicle that includes an engine, a hydraulic actuator, a hydraulic pump driven by the engine, an instruction member operated to instruct operation of the hydraulic actuator, a supply passage that supplies hydraulic oil discharged from the hydraulic pump to the hydraulic actuator, and a return passage that returns the hydraulic oil discharged from the hydraulic pump to an oil tank. The method includes when the engine speed is less than the comparison threshold value, opening the return passage so that the hydraulic oil flows through the return passage, in response to the operation of the instruction member, opening the return passage so that the hydraulic oil flows through the return passage, performing revving control to increase the engine speed, and changing the comparison threshold value from a first threshold value to a second threshold value that is lower than the first threshold value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a time chart of various control parameters.

DETAILED DESCRIPTION OF THE INVENTION

Figure 1:
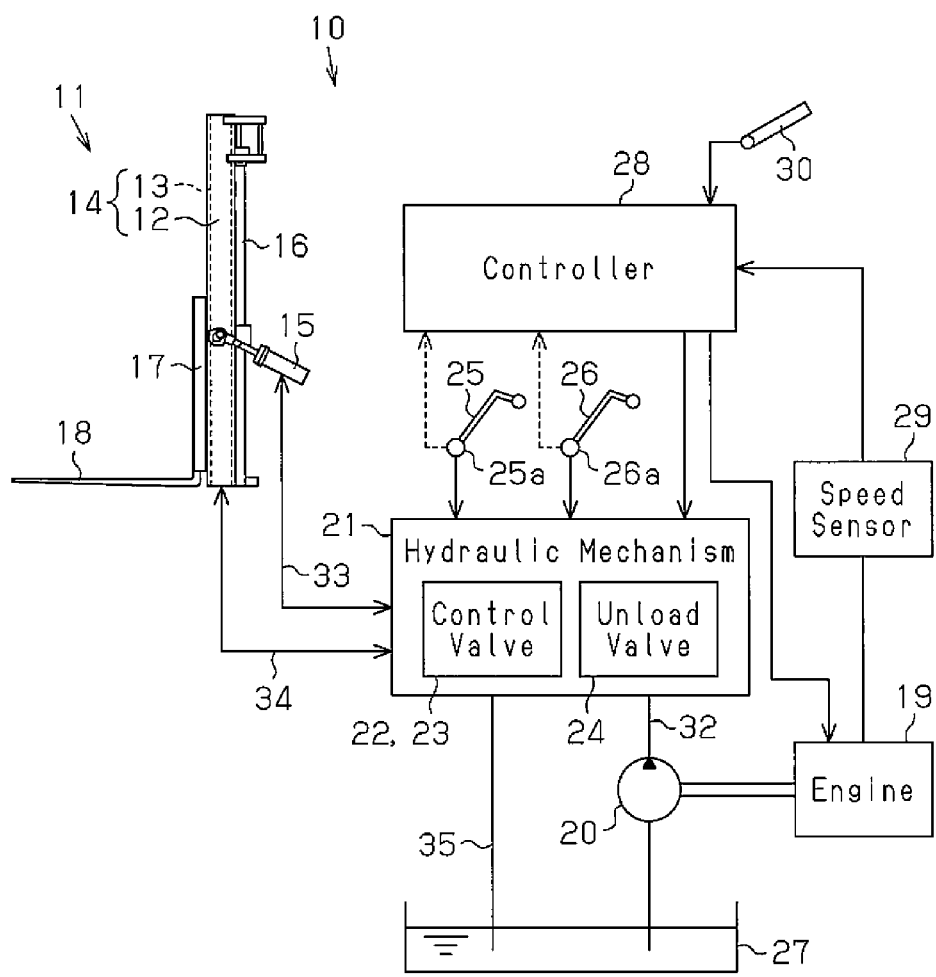
FIG. 1 is a schematic view showing the structure of a forklift.

Referring to FIGS. 1 and 2, one embodiment of an industrial vehicle will now be described.

As shown in FIG. 1, a forklift 10, which is an industrial vehicle, includes a material handling device 11 coupled to the vehicle body of the forklift 10. The material handling device 11 includes a multistage mast 14 including right and left outer mast members 12 and an inner mast member 13. The outer mast members 12 are coupled to a hydraulic tilt cylinder 15, which functions as a hydraulic actuator. The inner mast member 13 is coupled to a hydraulic lift cylinder 16, which functions as a hydraulic actuator. The mast 14 is tilted forward or rearward when hydraulic oil is supplied to or discharged from the tilt cylinder 15. The inner mast member 13 is lifted or lowered in the vertical direction when hydraulic oil is supplied to or discharged from the lift cylinder 16. A lift bracket 17 couples a fork 18 to the inner mast member 13. The fork 18 is lifted and lowered with the lift bracket 17 when the inner mast member 13 is lifted or lowered by the lift cylinder 16 along the outer mast members 12.

The forklift 10 includes, in the vehicle body, an engine 19, which serves as a driving source for the forklift 10 when driven and when handling material, a hydraulic pump 20, which is driven by the engine 19, and a hydraulic mechanism 21, which is supplied with hydraulic oil discharged from the hydraulic pump 20. The hydraulic mechanism 21 includes control valves 22 and 23 and an unload valve 24. The control valve 22 controls the supply and discharge of hydraulic oil to and from the tilt cylinder 15. The control valve 22 is mechanically coupled to a tilt operation member 25, which functions as an instruction member that is operated to instruct operation of the tilt cylinder 15. Operation of the tilt operation member 25 opens and closes the control valve 22. The control valve 23 controls the supply and discharge of hydraulic oil to and from the lift cylinder 16. The control valve 23 is mechanically coupled to a lift operation member 26, which functions as an instruction member that is operated to instruct operation of the lift cylinder 16. Operation of the lift operation member 26 opens and closes the control valve 23. The tilt operation member 25 and the lift operation member 26 are located in the operator cab of the forklift 10 and operable by the operator of the forklift 10. The unload valve 24 controls the discharge of hydraulic oil from the hydraulic pump 20 to an oil tank 27 arranged in the vehicle body.

The forklift 10 also includes a controller 28 in the vehicle body. The controller 28 controls the engine speed and opens and closes the unload valve 24 based on a detection signal received from a speed sensor 29 that detects the engine speed. Further, the controller 28 is electrically connected to a detection sensor 25a, which detects the operation state of the tilt operation member 25, and a detection sensor 26a, which detects the operation state of the lift operation member 26. The controller 28 detects the depression amount (accelerator operation amount) of an accelerator member (accelerator pedal) 30, which is operated by the operator to accelerate the forklift 10. The controller 28 controls the engine speed in accordance with the depression amount of the accelerator member 30. In the forklift 10 in which the hydraulic pump 20 is driven by the engine 19, the operator operates the tilt cylinder 15 and the lift cylinder 16 by operating the tilt operation member 25 and the lift operation member 26 while depressing the accelerator member 30.

The hydraulic pump 20 draws hydraulic oil from the oil tank 27 and then discharges the hydraulic oil. The flow of the hydraulic oil will now be described.

When the unload valve 24 is in a first position, hydraulic oil is sent to the control valves 22 and 23 through an oil passage 32, which is connected to the hydraulic pump 20. The hydraulic oil is then supplied to the oil chambers of the tilt cylinder 15 and the lift cylinder 16 through oil passages 33 and 34, which are connected to the control valves 22 and 23, respectively. For example, when the tilt operation member 25 is operated, the hydraulic oil discharged from the hydraulic pump 20 is supplied to the oil chamber of the tilt cylinder 15 through the oil passage 33, which is connected to the control valve 22. The hydraulic oil discharged from the oil chambers of the tilt cylinder 15 and the lift cylinder 16 is discharged to the oil tank 27 through an oil passage 35, which is connected to the control valves 22 and 23. When the unload valve 24 is in a second position, the hydraulic oil does not flow to the control valves 22 and 23. The hydraulic oil flows through the oil passage 32 and returns to the oil tank 27 through the oil passage 35, which is connected to the unload valve 24.

The operation of the forklift 10 of the present embodiment will now be described.

Referring to FIG. 2, in period A, the controller 28 sets a first threshold value Y1 as a comparison threshold value compared with the speed of the engine 19. When the engine speed is below the comparison threshold value, the controller 28 switches the unload valve 24 to the second position to open a return passage that returns the hydraulic oil from the hydraulic pump 20 to the oil tank 27. Thus, in period A, the controller 28 opens the return passage when the engine speed is below the first threshold value Y1. In period A, the accelerator member 30, the tilt operation member 25, and the lift operation member 26 are not operated and the hydraulic pump 20 is free from loads. In addition, the engine 19 is driven in accordance with a speed instruction X1 issued by the controller 28. The speed instruction X1 drives the engine 19 at an idling speed.

In period B shown in FIG. 2, when detecting the input of a signal based on the operation of the tilt operation member 25 or the lift operation member 26, the controller 28 outputs an unload instruction that switches the unload valve 24 to the second position to open the return passage. Thus, the hydraulic oil returns to the oil tank 27 without being supplied to the control valves 22 and 23. In the present embodiment, the return passage includes the unload valve 24 and the oil passage 35.

The controller 28 continues to output the unload instruction until the engine speed reaches the predetermined value or until time T1 ends. When the output of the unload instruction is stopped, the unload valve 24 returns to the first position and opens a supply passage, which supplies the tilt cylinder 15 and the lift cylinder 16 with hydraulic oil from the hydraulic pump 20. Thus, the hydraulic oil flows to the control valves 22 and 23 and is supplied to the tilt cylinder 15 and the lift cylinder 16. In the present embodiment, the supply passage includes the oil passage 32, the control valves 22 and 23, and the oil passages 33 and 34.

In addition to the unload instruction, the controller 28 outputs a speed instruction X2 to perform a revving control that increases the engine speed. The speed instruction X2 drives the engine 19 at a higher speed than the speed specified by the speed instruction X1. The controller 28 outputs the speed instruction X2 for the duration of time T2.

In the present embodiment, the load on the hydraulic pump 20 is reduced by opening the return passage and performing the revving control. Thus, the torque of the engine 19 remains sufficient since the load on the hydraulic pump 20 does not increase. Thus, engine stalling is avoided in the forklift 10 of the present embodiment.

Further, when outputting the unload instruction and the speed instruction X2, the controller 28 changes the comparison threshold value to a second threshold value Y2, which is lower than the first threshold value Y1. Although the engine 19 is being controlled to avoid engine stalling as described above, when the output of the unload instruction is stopped, the supply passage opens and increases the load on the hydraulic pump 20. This reduces the engine speed. Thus, if only the first threshold value Y1 were to be used as the comparison threshold value, after the hydraulic actuator starts to operate thereby reducing the engine speed, the controller 28 would output the unload instruction again, as shown by the single-dashed lines in FIG. 2. Thus, the output of the unload instruction would stop the tilt cylinder 15 or the lift cylinder 16 that has just started to operate. Such unstable operation may interrupt material handling and hinder adjustment of material handling position.

However, in the present embodiment, when operation of the tilt operation member 25 or the lift operation member 26 is detected, the comparison threshold value is set to the second threshold value Y2, which is lower than the first threshold value Y1. Thus, even if the engine speed is reduced after the hydraulic actuator starts to operate, the unload instruction is less likely to be output. As a result, the tilt cylinder 15 and the lift cylinder 16 are not stopped immediately after starting to operate.

After outputting the speed instruction X2 over time T2, the controller 28 stops the revving control and gradually reduces the value of the speed instruction to the value of the speed instruction X1. When stopping the revving control, the controller 28 also gradually increases the comparison threshold value to the first threshold value Y1.

In period C shown in FIG. 2, the tilt operation member 25 or the lift operation member 26 is continuously operated. In period C, the controller 28 outputs the unload instruction when the engine speed becomes lower than the first threshold value Y1. When the tilt operation member 25 or the lift operation member 26 is continuously operated like in period C and the engine speed is reduced, or the load on the hydraulic pump is increased, for example, the hydraulic cylinder may have reached the stroke end position. Thus, when the engine speed becomes less than the first threshold value Y1, the controller 28 outputs the unload instruction to reduce the load on the hydraulic pump 20 and avoid engine stalling.

As described above, a sudden change in the load when starting material handling is detectable from the operation of the tilt operation member 25 and the lift operation member 26. However, a sudden change in the load when the hydraulic cylinder reaches the stroke end is not detectable from the operation of the tilt operation member 25 and the lift operation member 26. In this case, unlike when starting material handling, it is difficult to determine when to start the revving control of the engine 19. Thus, in the present embodiment, the comparison threshold value includes the first and second threshold values Y1 and Y2. When ending the revving control that is performed when material handling is started, the comparison threshold value is returned to the first threshold value Y1, which is higher than the second threshold value Y2. This results in an earlier output of the unload instruction. By changing the comparison threshold value between the first threshold value Y1 and the second threshold value Y2 in accordance with the present situation, engine stalling is prevented even if the unload instruction is output in response to a decrease in the engine speed.

The advantages of the present embodiment will now be described.

(1) If operation of the tilt operation member 25 or the lift operation member 26 is detected when starting material handling, the controller 28 outputs the unload instruction and performs revving control. This decreases the load on the hydraulic pump 20 before the engine speed is reduced. Thus, engine stalling is obviated in a preferable manner.

(2) The comparison threshold value includes the first threshold value Y1 and the second threshold value Y2. When starting material handling, the comparison threshold value is set to the second threshold value Y2. This reduces the frequency of output of the unload instruction while avoiding engine stalling by the revving control. As a result, the tilt cylinder 15 and the lift cylinder 16 are not stopped immediately after starting to operate.

(3) When stopping the revving control, the controller 28 returns the comparison threshold value to the first threshold value Y1. Thus, when a sudden change in the load on the hydraulic pump occurs at a timing other than when material handling is started, the unload instruction may be promptly output to reduce the load on the hydraulic pump 20. This obviates engine stalling in a preferable manner.

(4) For example, if the comparison threshold value were to include only the first threshold value Y1, the unload instruction would be output more frequently when material handling is started. If the comparison threshold value were to include only the second threshold value Y2, engine stalling may not be avoided under a situation in which the timing for starting the revving control cannot be specified. The present embodiment changes the comparison threshold value between the first threshold value Y1 and the second threshold value Y2 depending on the present situation. This obviates engine stalling and stabilizes the operation of the hydraulic actuators.

(5) The comparison threshold value is slowly returned from the second threshold value Y2 to the first threshold value Y1 by gradually increasing the comparison threshold value. This ensures the effectiveness for setting the second threshold value Y2 while taking into consideration response delays that occur in the control.

It should be apparent to those skilled in the art that the present invention may be embodied in many other specific forms without departing from the spirit or scope of the invention. Particularly, it should be understood that the present invention may be embodied in the following forms.

The control valves 22 and 23 may be electromagnetic valves. The controller 28 may send signals to open and close the electromagnetic valves. In this case, when the tilt operation member 25 and the lift operation member 26 are not operated, the hydraulic oil is continuously discharged to the oil tank 27 through the return passage. When detecting operation of the tilt operation member 25 or the lift operation member 26, the controller 28 holds the control valves 22 and 23 for a predetermined time to continue the discharge of hydraulic oil through the return passage. Then, after the predetermined time, the controller 28 controls the control valves 22 and 23 to open the supply passage. The controller 28 also performs the revving control on the engine 19 and changes the comparison threshold value. This embodiment has the same advantages as the embodiment described above.

When gradually increasing the comparison threshold value to the first threshold value Y1 after the controller 28 stops the revving control, the comparison threshold value may be increased linearly or may be increased in step by step.

The hydraulic actuator is not limited to the lifting hydraulic cylinder and the tiling hydraulic cylinder and may be a different hydraulic cylinder such as one that moves an attachment of the forklift 10. Further, the hydraulic actuator may be a hydraulic power steering device.

The speed instruction may be returned to the speed instruction X1 when the time T2 ends. In addition, the comparison threshold value may be returned to the first threshold value Y1 when the revving control ends.

The industrial vehicle may include a single hydraulic actuator or three or more hydraulic actuators.

The control of the present embodiment is applicable to industrial vehicles other than forklifts.

The present examples and embodiments are to be considered as illustrative and not restrictive and the invention is not to be limited to the details given herein, but may be modified within the scope and equivalence of the appended claims.

The invention claimed is:

1. An industrial vehicle comprising:
   an engine;
   a hydraulic actuator;
   a hydraulic pump driven by the engine;
   an instruction member, including a tilt operation member or a lift operation member or both the tilt operation member and the lift operation member, wherein the instruction member operates the hydraulic actuator;
   a supply passage adapted to supply hydraulic oil discharged from the hydraulic pump to the hydraulic actuator;
   a return passage adapted to return the hydraulic oil discharged from the hydraulic pump to an oil tank; and
   a controller adapted to compare an engine speed and a predetermined comparison threshold value, wherein the controller is adapted so that when the engine speed is less than the comparison threshold value, the controller opens the return passage so that the hydraulic oil flows through the return passage, wherein
   the comparison threshold value includes a first threshold value and a second threshold value that is lower than the first threshold value, and
   the controller is adapted to, in response to the operation of the instruction member, open the return passage so that the hydraulic oil flows through the return passage, perform revving control to increase the engine speed, and change the comparison threshold value from the first threshold value to the second threshold value.

2. The industrial vehicle according to claim 1, wherein the controller is adapted to return the comparison threshold value to the first threshold value when ending the revving control.

3. The industrial vehicle according to claim 2, wherein the controller is adapted to return the comparison threshold value to the first threshold value by gradually increasing the comparison threshold value.

4. A method for controlling an industrial vehicle that includes an engine, a hydraulic actuator, a hydraulic pump driven by the engine, an instruction member that includes a tilt operation member or a lift operation member or both the tilt operation member and the lift operation member, wherein the instruction member operates the hydraulic actuator, a supply passage that supplies hydraulic oil discharged from the hydraulic pump to the hydraulic actuator, and a return passage that returns the hydraulic oil discharged from the hydraulic pump to an oil tank, the method comprising:
  when the engine speed is less than a comparison threshold value, opening the return passage so that the hydraulic oil flows through the return passage;
  in response to the operation of the instruction member, opening the return passage so that the hydraulic oil flows through the return passage, performing revving control to increase the engine speed, and changing the comparison threshold value from a first threshold value to a second threshold value that is lower than the first threshold value.

5. The method according to claim 4, further comprising returning the comparison threshold value to the first threshold value when ending the revving control.

6. The method according to claim 5, wherein the returning the comparison threshold value to the first threshold value includes gradually increasing the comparison threshold value.

* * * * *